United States Patent [19]

Aycock

[11] Patent Number: 4,755,573

[45] Date of Patent: Jul. 5, 1988

[54] CATIONIC POLYMERIZATION OF BROMOALKENYL AROMATIC COMPOUNDS WITH AROMATIC CHAIN TRANSFER AGENT, AND PRODUCTS

[75] Inventor: David F. Aycock, Glenmont, N.Y.

[73] Assignee: General Electric Company, Selkirk, N.Y.

[21] Appl. No.: 798,479

[22] Filed: Nov. 15, 1985

[51] Int. Cl.$^4$ .................................................. C08F 4/06
[52] U.S. Cl. ..................................... 526/90; 526/206; 526/209; 526/238; 526/293; 526/294
[58] Field of Search ................. 526/238, 293, 294, 90, 526/206, 209

[56] References Cited

U.S. PATENT DOCUMENTS

| | | | |
|---|---|---|---|
| 3,272,786 | 9/1966 | Perry .................................... | 526/293 |
| 3,426,005 | 2/1969 | Serniuk et al. ........................ | 526/238 |
| 3,489,737 | 1/1970 | Natta et al. ........................... | 526/293 |
| 3,534,012 | 10/1970 | Dennis .................................. | 526/293 |
| 3,635,924 | 1/1972 | Nakaguchi ............................ | 526/293 |
| 4,074,035 | 2/1978 | Powers et al. ........................ | 526/238 |
| 4,107,231 | 8/1978 | Wurmb et al. ........................ | 260/873 |
| 4,137,212 | 1/1979 | Theysohn et al. .................... | 260/45.7 |
| 4,143,221 | 3/1979 | Naarmann et al. ................... | 525/357 |
| 4,223,169 | 9/1980 | Barda ................................... | 568/645 |

FOREIGN PATENT DOCUMENTS

| | | | |
|---|---|---|---|
| 0093202 | 11/1983 | European Pat. Off. ............. | 526/293 |
| 1570395 | 11/1969 | Fed. Rep. of Germany ...... | 526/293 |
| 8603508 | 6/1986 | Int'l Pat. Institute ............. | 526/293 |
| 7812460 | 6/1980 | Netherlands ........................ | 526/293 |

OTHER PUBLICATIONS

Brittles, Journal of Polymer Science, Part A, vol. 2, pp. 1221–1231, (1964).

*Primary Examiner*—Joseph L. Schofer
*Assistant Examiner*—J. M. Reddick
*Attorney, Agent, or Firm*—Hedman, Gibson, Costigan & Hoare

[57] ABSTRACT

Flame retardant poly(alkenyl aromatic) oligomers and lower molecular weight polymers having bromine substituents on the aromatic nucleus are prepared by cationic polymerization from the corresponding brominated monomers, for example, bromostyrene, in an organic solvent, using a Lewis acid catalyst and an aromatic chain transfer agent. The lower molecular weights enable greater tolerance with other thermoplastic polymers, and as a result compatible flame retardant blends with good ductile impact properties are possible.

21 Claims, No Drawings

CATIONIC POLYMERIZATION OF BROMOALKENYL AROMATIC COMPOUNDS WITH AROMATIC CHAIN TRANSFER AGENT, AND PRODUCTS

BACKGROUND OF THE INVENTION

1. Field of the Invention

This invention relates to the production of poly(bromoalkenyl aromatics), such as poly(bromostyrenes), by cationic polymerization of the monomers in the presence of a Lewis acid catalyst and an aromatic chain transfer agent.

2. Description of the Prior Art

Polystyrene resins containing bromine atoms on the aromatic ring nucleus have become of greater interest in recent years because of their flame retardancy properties. For instance, brominated styrene oligomers have been disclosed for use as flame retardant materials with nylon molding resins in U.S. Pat. No. 4,137,212 (Theysohn, et al.), and with linear polyester resins in U.S. Pat. No. 4,107,231 (Wurmb, et al.). Bromine-containing styrene oligomers and polymers have also been proposed for use with polyphenylene ether (oxide) resins, essentially for this same purpose.

The development of styrene polymerization has an extended history, and various procedures, including those involving cationic polymerization, have become known over the years. A survey of the art in the ENCYLOPEDIA OF POLYMER SCIENCE AND TECHNOLOGY, John Wiley and Sons, Inc., Volume 3, pages 36 to 37 and page 603 (1965), reports some of the knowledge collected about the cationic polymerization of styrene and related compounds. It is known, for instance, that styrene can be produced in this manner in an organic solvent, using various Lewis acid catalysts. Monomers such as styrene, α-methylstyrene, indene and acenaphthylene can be polymerized cationically to high molecular weight products, but such processes have no commercial interest. Further, if styrene is cationically polymerized in toluene in particular, the resulting polymers have markedly lower molecular weights than if the polymerization is carried out in, say, carbon tetrachloride.

U.S. Pat. No. 4,143,221 (Naarmann, et al.) discloses a method for the production of styrene polymers or copolymers containing bromine by cationic polymerization of the monomer or comonomers, in an organic solvent, for example, a halohydrocarbon such as 1,2-dichloroethane, in the presence of a Lewis acid catalyst. The method is continued by adding bromine to the polymer solution, to give a brominated polystyrene, using the same catalyst for the bromination as for the polymerization. The Naarmann, et al. patent also refers to German Pat. No. 1,570,395 as concerning heat-stable styrene polymers obtained by polymerization of nuclear-brominated styrene, although no details are given. Elsewhere in the chemical literature, the cationic polymerization of para-bromostyrene has been reported; J. Prakt. Chem., 314,557 (1972).

The literature also refers to the clay-catalyzed cationic polymerization of styrene in a mixed solvent such as toluene and 1,2-dichloroethane and reports that a major fraction of the saturated ends of the resulting polymer are methylphenyl, formed by condensation with solvent toluene; J. of Pol. Sci.: Part A, Vol. 2, pp. 221-31 (1964).

SUMMARY OF THE INVENTION

It is an object of this invention to provide a method for the cationic polymerization of bromostyrene and of other nuclear bromine-substituted alkenyl aromatic monomeric compounds to oligomers (for example, two, three or four monomer units in the chain) and to low molecular weight polymers.

It is a further object of this invention to provide a cationic polymerization method for producing bromoalkenyl aromatic oligomers and low molecular weight polymers, in which the molecular weight of the final product is carefully controlled so as not to exceed certain desired levels.

It is an additional object of this invention to provide a flame retardant poly(bromoalkenyl aromatic) in which the bromine content is carefully regulated to achieve suitable levels of flame resistance.

It is a still further object of this invention to provide flame retardant thermoplastic compositions of such poly(bromoalkenyl aromatics) in compatible admixture with other polymers.

These objectives are attained by practice of the present invention in its various aspects.

Briefly, it has now been discovered that brominated alkenyl aromatic compounds can be cationically polymerized in an organic solvent, using a Lewis acid catalyst, and if done in the presence of an aromatic chain transfer agent, the resulting poly(bromoalkenyl aromatic) polymers have lower molecular weights than expected.

It has been also discovered that both aromatic compounds and polymers are useful as the transfer agent and, further, that they serve as chain stoppers to sharply curtail the polymerization reaction and to limit the molecular weight of the polymer which is formed.

In addition, it has been discovered that these lower molecular weight poly(bromoalkenyl aromatics) show unusually good compatibility with other thermoplastic polymers over a wide range of amounts, and that articles extruded and molded from such compositions are not only flame retardant, but also possess good Gardner (ductile) impact strength.

DESCRIPTION OF THE INVENTION

The bromoalkenyl aromatic polymers of this invention are prepared by a process which in its broadest aspects comprises (a) cationically polymerizing a nuclear bromine-substituted alkenyl aromatic monomer or mixture of monomers in solution in an organic solvent, in the presence of a Lewis acid catalyst and an aromatic chain transfer agent for the cationic polymerization reaction, until the desired molecular weight has been achieved; and (b) separating and isolating the resulting poly(bromoalkenyl aromatic) polymer from the reaction mixture.

The polymerization reaction is exothermic and will proceed readily under ambient conditions of temperature and pressure due to the reactivity of the bromine-substituted alkenyl aromatic monomer. Thus, in most cases the polymerization can be carried out by reliance on the heat of reaction as the sole heat source. If it is desired to control the rate of reaction more carefully, standard means such as a cooling jacket can be employed for the purpose.

Selection of the bromine-containing alkenyl aromatic monomer will obviously depend on the desired end product. For instance, if a poly(alkenyl aromatic) polymer having an average of approximately two bromine atoms substituted on the aromatic nucleus, hence a poly(dibromoalkenyl aromatic) resin, is intended then a dibromoalkenyl aromatic compound is the most likely starting material. In practice, however, it is sometimes the case that the starting material comprises a mixture of mono-, di-, etc., brominated alkenyl aromatic compounds. The present process can be just as easily be conducted using such mixtures. Moreover, depending on the relative proportions of the brominated alkenyl aromatic starting materials, the polymer produced in the reaction can be characterized by an average bromine substitution (di-, tri-, etc.) essentially the same as if a single monomer type, instead of a mixture, were utilized.

Thus, for the sake of convenience, unless otherwise indicated the term "poly(bromoalkenyl aromatic)" is used in this disclosure to refer to homopolymers, as well as copolymers, or homooligomers and cooligomers, made from nuclear bromine-containing alkenyl aromatic compounds, and is inclusive of polymers in which the average degree of nuclear bromine substitution varies from the minimum (one bromine atom per aromatic nucleus for each monomer unit) to the maximum (for instance, five nuclear bromine atoms per monomer unit). The alkenyl aromatic monomers suitable for use in the process of this invention are generally alkenyl aromatic compounds having one or more bromine atoms, usually from one to three bromine atoms, substituted on the aromatic ring. Preferably, such compounds are of the formula

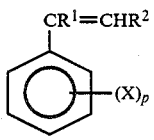

in which X represents independently a lower alkyl group having from 1 to 6 carbon atoms, a lower alkenyl group having from 1 to 6 carbon atoms, and bromine, with at least one bromine atom always being present on the ring; p represents the total number of X substituents on the ring and is an integer from 1 to 5 (thus, p is always at least one and X always represents at least one bromine atom, whether or not other substituents, including other bromine atoms, are present on the aromatic or ring portion of the compound); and $R^1$ and $R^2$ represent independently lower alkyl groups having from 1 to 6 carbon atoms, lower alkenyl groups having from 1 to 6 carbon atoms, and hydrogen.

Compounds within the above formula encompass bromostyrene, as well as its homologs and analogs. Examples are 2-, 3- and 4-bromostyrene; 2,3-, 2,4-, 2,5-3,4- and 3,5-dibromostyrene; 2,3,4-, 2,4,5- and 3,4,5-tribromostyrene; 2-methyl-3-bromostyrene; 2-bromo-3-methylstyrene; 3-methyl-4-bromostyrene; 3-methyl-5-bromostyrene; 3-bromo-5-methylstyrene; 2,3-dibromo-5-methylstyrene; 2,5-dibromo-3-methylstyrene; and the like.

Especially favored for the practice of this invention are mono-, di- and tribromostyrenes, either individually or in mixtures of two (for instance, mono- and dibromostyrene, or di- and tribromostyrene), or three (mono-, di- and tribromostyrene).

The catalyst for the cationic polymerization reaction is a Lewis acid (some of which are also known as Friedel-Crafts reagents because of their use in the classical Friedel-Crafts reaction). Any of the Lewis acids known to be useful in cationic polymerization reactions can be employed here, including metal salts such as aluminum trichloride ($AlCl_3$), boron trifluoride ($BF_3$), antimony pentachloride ($SbCl_5$), stannic chloride ($SnCl_4$), titanium tetrachloride ($TiCl_4$) and ferric chloride ($FeCl_3$). Also suitable are sulfuric acid ($H_2SO_4$) and, of lesser significance, iodine and active salts such as triphenylmethyl, triethyloxonium and nitronium fluoroborates.

The Lewis acids usually function as proton donors to initiate or faciliate the polymerization. Selection of the proper amounts is within the skill of those in the art. In general, these amounts will depend on the desired molecular weight of the polymer, and most often they will vary from about 0.1 to about 2 percent by weight, based on 100 percent by weight of the monomer to be polymerized.

To control the molecular weight of the polymer being produced in accordance with the present invention, it is essential to include a chain transfer agent in the reaction mixture and to carry out the polymerization in its presence. Suitable chain transfer agents are aromatic compounds, or aromatic polymers, having a rate of alkylation (on the aromatic ring) equal to or greater than that of the compound chlorobenzene, and which do not contain substituents that interfere with the Lewis acid catalyst. Representative compounds are toluene, chlorobenzene, bromobenzene, fluorobenzene, alkyl aromatic ethers, such as anisole, and diphenyl ethers. Examples of polymeric chain transfer agents are aromatic polymers such as polyphenylene ethers(oxides) and polystyrenes.

The amount of chain transfer agent used will depend on the desired molecular weight of the bromostyrene polymer and the ease with which the chain transfer agent is alkylated. For instance, chain transfer agents that alkylate less readily than toluene, such as chlorobenzene, have to be used at higher levels than toluene. Chain transfer agents that alkylate more easily than toluene, such as anisole, can be used at lower levels. Toluene is a highly desired chain transfer agent because of its low cost, low toxicity, and its efficiency in controlling the molecular weight of the polystyrene. To control the molecular weight of poly(bromostyrene) to a level where it is compatible with a number of commonly used thermoplastics, the toluene level in the polymerization reaction should be at or above 5 percent based on 100. percent by weight of the bromostyrene.

The polymerization reaction must necessarily be conducted in solution. Particularly suitable as the solvents are organic compounds in which the starting materials (monomer, Lewis acid catalyst, chain transfer agent, etc.) and the polymer formed in the reaction are soluble. Halohydrocarbon solvents are especially useful, examples of which include but are not limited to methylene chloride, chloroform, carbon tetrachloride, 1,2-dichloroethane, 1,1,2-trichloroethane, dibromomethane, and 1,2-dibromoethane. Most preferred is methylene chloride.

The polymerization is generally carried out by adding the monomer or mixture of monomers to a mixture of the solvent, Lewis acid catalyst and chain transfer agent, with thorough mixing of the reaction solution. Care should be taken to see that the reaction temperature is not too high, in order to avoid undesirable side reactions. The temperature of the mixture can vary from 0° to 100° C. under most circumstances. With methylene chloride the temperature is conveniently kept to its boiling point of 40° C. Thus, the polymerization can be carried out cold or at temperatures not much above room temperature (e.g., 25° C.).

The chain transfer agent participates in the polymerization reaction and forms a terminal (end) group on the polymer chain. Thus, the polymer prepared from bromostyrene monomers by the process of this invention can be represented by the following formula

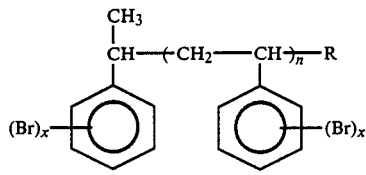

in which n represents the total number of bromostyrene monomer units in the chain (in addition to the terminal bromostyrene unit shown) and is zero or an integer from 1 to 10, preferably 1 to about 7, x represents the total number of bromine atoms on each aromatic ring and is preferably an integer from 1 to 3, and R represents the other terminal group on the polymer chain and is an aromatic radical derived from the aromatic chain transfer agent used in the polymer forming reaction.

If, for instance, toluene is the chain transfer agent, the resulting polymer can be characterized as follows:

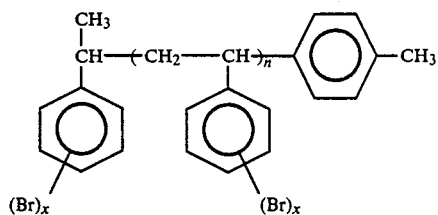

where x and n are as defined above.

It should be understood that if an aromatic polymer is used as the chain transfer agent, which is also permissible, the resulting poly(bromoalkenyl aromatic) resin will in effect be a graft copolymer, with the polymeric chain transfer agent acting as a chain stopper to form a terminal part of the bromostyrene polymer.

The flame retardant properties of the poly(bromoalkyl aromatic) produced with this invention will generally increase with the bromine content in the polymer. Best results appear to occur with bromine contents from about 45 to about 60 percent by weight, based on 100 percent by weight of the polymer.

Once the polymer has been formed, it can be separated and isolated from the reaction mixture by a number of techniques. In one procedure, an antisolvent (that is, in which the polymer is not soluble), for example, methanol, is added in an amount sufficient to cause the polymer to precipitate from solution. The polymer is thereafter recovered, as by decanting or filtration, and dried. In another procedure, water is added to the reaction mixture, with agitation, as an extractant for the water soluble components, the mixture is allowed to resolve into two phases, namely a water phase and an organic phase, the water phase is separated, and the organic phase is distilled to remove the solvent, leaving the polymer as a residue.

Ideally, the molecular weight (number or weight average) of the poly(bromoalkenyl aromatic) will be low enough to enable compatible admixture with many other thermoplastic polymers, including polyphenylene ether (oxide) resins; non-halogenated alkenyl aromatic resins, such as high impact, rubber modified polystyrene resins, styrene-acrylonitrile-butadiene copolymers, styrene-acrylonitrile copolymers and styrene-butadiene copolymers; polycarbonate resins; polyester resins, for instance, poly(alkylene terephthalates), such as polyethylene terephthalate and poly (1,4-butylene terephthalate); and polyamides, for instance, the nylon resins.

Particularly of interest are blends of the poly(-bromoalkenyl aromatics) with polyphenylene ether resins.

The polyphenylene ethers(also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

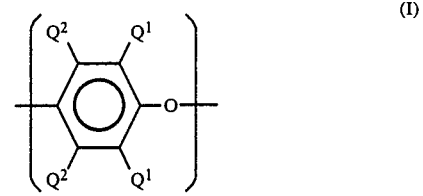

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3-, or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.45 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and β-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

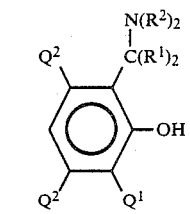

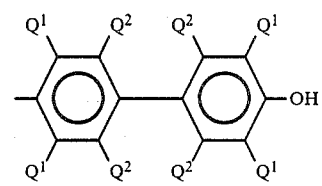

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

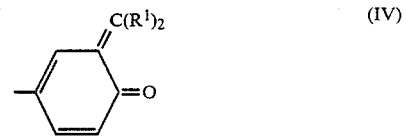

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

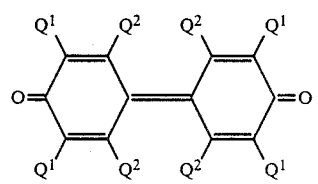

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The most suitable molecular weights for the poly(- bromoalkenyl aromatic) will be determined in large part by the particular polymer or polymers with which it is to be blended, as well as by the degree of bromine substitution on the aromatic rings in the poly (bromoalkenyl aromatic) polymer chain. As an illustration, for blends with polyphenylene ethers, the most advantageous molecular weights of poly(dibromostyrenes) according to this invention appear to be no greater than about 1250 weight average and no greater than about 850 number average. On the other hand, for blends with the same polyphenylene ethers the poly(tribromostyrenes) are most compatible when the molecular weights are no greater than about 1150 weight average and about 900 number average. Standard methods are used to measure these molecular weights, as explained in the examples.

Whether or not the polymers are compatible, or miscible, with one another can be readily determined by solvent casting a mixture of the polymers into a film having a thickness, for instance, of about 0.5 millimeter, and visually observing the film for optical clarity. The greater the clarity, the more compatible the polymers. Conversely, incompatibility or poor compatibility is manifested by varying degrees or opacity, or by the noticeable presence of streaks indicating a lack of homogeneity. Lack of compatibility can also be manifested by the presence of more than one distinct glass transition temperature for the polymer mixture, or by poor Gardner (ductile) impact strengths for moldings made from the mixture, as is also illustrated in the examples.

These various compositions can also include conventional supplementary ingredients for their conventional functions, for instance, antioxidants, stabilizers, mineral fillers, glass reinforcements, plasticizers, coloring agents, lubricants, mold release agents, conductive carbon blacks, additional flame retardant agents or synergists to upgrade the flame resistance still further, and so forth. The amounts will vary within the usual or standard ranges for these materials.

The compositions can be extruded or molded into the products normally made from thermoplastic engineering resinous materials, varying from component parts for automobiles to household appliances for everyday use.

DESCRIPTION OF THE SPECIFIC EMBODIMENTS

The process, polymer and polymer blends of this invention are illustrated in the examples which follow, which are not meant to be limiting. In each of Examples 1-11, the bromostyrene monomer contained about 250 parts per million (ppm) of tert-butylcatechol, as a stabilizer.

EXAMPLE 1

To a liter volume capacity reaction flask equipped with a stirrer and condenser were added 1500 milliters of methylene chloride, and 1260 grams of a mixture containing 8.7% monobromostyrene, 85.3% dibromostyrene and 6% tribromostyrene. A solution was thus formed. To the stirred solution 5.2 grams of anhydrous aluminum trichloride ($AlCl_3$) were added. The reaction proceeded exothermically, and the heat of reaction caused the methylene chloride to reflux for about 60 minutes. The reaction mixture was stirred for an additional 60 minutes, after which the polymer was precipitated in methanol, filtered, and dried in a vacuum oven.

EXAMPLE 2

The procedure of Example 1 was repeated, but using 1500 grams of a mixture of 8.7% monobromostyrene, 85.3% dibromostyrene and 6% tribromostyrene, as well as 70 grams of toluene, 3425 grams of methylene chloride, and 9.5 grams of anhydrous aluminum trichloride ($AlCl_3$). After 3 hours of reaction time, 100 milliliters of water were added, the water phase was separated, and the solvents were distilled from the polymer.

EXAMPLE 3

The same procedure was repeated, but with 1500 grams of a mixture of 8.7% monobromostyrene, 85.3% dribromostyrene and 6% tribromostyrene, as well as 140 grams of toluene, 3355 grams of methylene chloride, and 8 grams of aluminum trichloride ($AlCl_3$). After 2 hours reaction time, 400 milliliters of water were added, the water phase was separated, and the solvents were distilled from the polymer.

EXAMPLE 4

The same procedure was again repeated, but using 1500 grams of a mixture of 8.7% monobromostyrene, 85.3% dibromostyrene and 6% tribromostyrene, 270 grams of toluene, 3225 grams of methylene chloride, and 11 grams of aluminum trichloride ($AlCl_3$). After about 2 hours of reaction, the polymer was precipitated in methanol. The polymer, which was a gum, was dried in a vacuum oven.

EXAMPLE 5

To a 100-milliter flask outfitted with a condenser and a magnetic stirring bar were added 10 grams of a mixture of 8.7% monobromostyrene, 85.3% dibromostyrene and 6% tribromostyrene, 3.7 grams of toluene, 19.5 grams of methylene chloride, and 0.08 gram of aluminum trichloride ($AlCl_3$). Precipitation of the polymer in methanol followed by drying yielded a viscous gum.

EXAMPLE 6

The same procedure was repeated, but with 1000 grams of a mixture of 8.7% monobromostyrene, 85.3% dibromostyrene and 6% tribromostyrene, 2150 grams of toluene and 10 grams of anhydrous aluminum trichloride ($AlCl_3$). The exothermic heat of reaction was controlled using a jacketed water bath to prevent the temperature from going above 60° C. After one hour, 200 milliliters of 5% aqueous hydrochloric acid (HCl) were added and the resulting water phase was removed. The toluene was distilled from the polymer to leave a non-viscous oil.

EXAMPLE 7

To a 1000-milliliter flask equipped with a condenser and magnetic stirring bar were added 10 grams of a mixture of 8.7% monobromostyrene, 85.3% dibromostyrene and 6% tribromostyrene, 23 grams of chlorobenzene, and 0.08 gram of anhydrous aluminum trichloride (AlCl₃) The reaction temperature increased to about 55° C. The polymer was precipitated in methanol and vacuum dried.

EXAMPLE 8

To a 50-milliliter flask containing a condenser and stirring bar were added 5 grams of a mixture of 8.7% monobromostyrene, 85.3% dibromostyrene and 6% tribromostyrene, 11.5 grams of bromobenzene, and 0.1 gram of anhydrous aluminum trichloride (AlCl₃). The polymer was precipitated in methanol and vacuum dried.

EXAMPLE 9

To a one-liter flask equipped with a stirrer and a condenser were added 8 grams of tribromostyrene, 130 grams of methylene chloride, and 0.5 gram of anhydrous aluminum trichloride (AlCl₃). After one hour of reaction, the mixture was extracted with water and the solvent was removed.

EXAMPLE 10

To a 50-milliliter flask containing a condenser and a stirring bar were added 5 grams of tribromostyrene, 0.47 gram of toluene, 11.17 grams of methylene chloride, and 0.1 gram of anhydrous aluminum trichloride (AlCl₃). After one hour, the polymer was precipitated in methanol and vacuum dried.

EXAMPLE 11

To a 50-milliliter flask containing a condenser and a stirrer bar were added 5 grams of tribromostyrene, 0.9 gram of toluene, 10.8 grams of methylene chloride, and 0.1 gram of anhydrous aluminum trichloride (AlCl₃). The polymer was precipitated in methanol and vacuum dried.

The Table below contains physical characteristics of the polymers prepared in the foregoing examples. The reported molecular weights ($Mw$=weight average; $Mn$=number average) were determined by gel permeation chromatography (GPC), calibrated with monodisperse polystyrene standards down to a molecular weight of 8500, and below 3000 calibrated with bromostyrene oligomers containing a toluene end group.

TABLE 1

| Bromostyrene Polymer (Example) | Physical Form | % Br | Mw | Mn |
|---|---|---|---|---|
| 1 | glassy | 58.9 | 3700 | 1500 |
| 2 | glassy | 57.0 | 1700 | 1000 |
| 3 | glassy | 53.9 | 1200 | 800 |
| 4 | glassy | 52.0 | 880 | 650 |
| 5 | gum | ND | 660 | 510 |
| 6 | oil | 45.3 | 430 | 380 |
| 7 | glassy | ND | 2300 | 1100 |
| 8 | glassy | ND | 3400 | 2400 |
| 9 | glassy | ND | 5300 | 1900 |
| 10 | glassy | ND | 1100 | 850 |
| 11 | glassy | ND | 720 | 590 |

ND = Not determined

Solutions were prepared containing 5% by weight of the various bromostyrene polymers of each of the above Examples (1-11) with, in one set, 5% by weight of poly(2,6dimethyl-1,4-phenylene ether) resin, in a second set, 5% by weight of polystyrene (unhalogenated), and in a third set, 5% by weight of a styrene-acylonitrile copolymer (Dow's Tyril 860 SAN). Chloroform was used as the solvent for the solutions containing the poly(2,6-dimethyl-1,4-phenylene ether) resin and the polystyrene. Tetrahydrofuran was the solvent for the solutions containing the styrene-acrylonitrile copolymer.

Clear films were formed with the polybromostyrenes of Examples 3,4,5 and 6 in all of the cases (that is, with the polyphenylene ether, polystyrene and SAN, respectively). A slightly cloudy film was formed from the polybromostyrene of Example 2 with the polyphenylene ether, polystyrene and SAN, respectively. These results show that for the polymers made from dibromostyrene primarily and terminated with toluene groups, having molecular weights close to or lower than that of Example 3, compatible blends can be made with any of the polyphenylene ether, the polystyrene and the SAN.

Moreover, clear films were also formed from the bromostyrene polymers of Examples 10 and 11 with poly(2,6-dimethyl-1,4-phenylene ether), polystyrene and SAN, respectively. These results show that compatible blends can be made with toluene-terminated tribromostyrene polymers having molecular weights close to, or below, that of Example 10.

EXAMPLE 12

An experiment was conducted to compare the polymerization of dibromostyrene with styrene in toluene and methylene chloride (dichloromethane), respectively. It was interesting to find that toluene was much more effective in functioning as a chain stopper to control the molecular weight of dibromostyrene, and far less effective for the same purpose with styrene.

The polymerization was conducted by adding the monomer (styrene, or dibromostyrene) to the solvent (toluene, or methylene chloride) with stirring and after 2 hours, distilling off the solvent to recover the polymer. Measurements of the molecular weight were made using the same procedures described in the previous examples. The results are shown in Table 2.

TABLE 2

| Sample No. | % Styrene | % DBS | % Toluene | % MeCl₂ | Mw | Mn |
|---|---|---|---|---|---|---|
| 1 | — | 39 | — | 61 | 3700 | 1500 |
| 2 | — | 31 | 69 | — | 430 | 380 |
| 3 | 30 | — | — | 70 | 8950 | 2800 |
| 4 | 30 | — | 70 | — | 2300 | 1100 |

In the case of dibromostyrene, dimers and trimers were formed when polymerized in toluene. With styrene, however, the toluene only lowered the weight average molecular weight to 2300, as shown.

EXAMPLE 13

To evaluate the effect of molecular weight on the glass transition temperature (Tg) of poly(bromostyrenes) according to this invention, the glass transition temperatures of the polymers prepared in Examples 1-4, above, were measured. The glass transition temperatures were measured in a Perkin Elmer II DSC. Each sample was first heated to above its Tg, then cooled and heated at a rate of 5° C. per minute to determine the Tg. The results are reported in Table 3; the molecular weights are repeated from Table 1.

TABLE 3

| Polymer Sample | Tg. °C. | Mw | Mn |
|---|---|---|---|
| Example 1 | 106 | 3700 | 1500 |

TABLE 3-continued

| Polymer Sample | Tg. °C. | Mw | Mn |
| --- | --- | --- | --- |
| Example 2 | 66 | 1700 | 1000 |
| Example 3 | 40 | 1200 | 800 |
| Example 4 | 15 | 880 | 650 |

The bromostyrene polymers showed a smooth drop in Tg as the molecular weight decreased, as can be seen.

A 50:50 wt. % mixture of the polymer of Example 1 with poly(2,6-dimethyl-1,4-phenylene ether) resin (PPO ®, General Electric Co., intrinsic viscosity 0.47 dl./g. in chloroform at 25° C.) gave two distinct Tg's, 138° and 205° C., respectively, which indicated that at this molecular weight (Mw=3700, Mn=1500) the two polymers are not compatible. The Table below, however, shows that the polymer of Example 3, molecular weight (Mw) of 1200, is miscible over the entire range of amounts with the same poly (2,6-dimethyl-1,4-phenylene ether).

TABLE 4

| Wt. % PPO ® | Tg. °C. |
| --- | --- |
| 0 | 40 |
| 20 | 68 |
| 40 | 108 |
| 60 | 143 |
| 80 | 177 |
| 100 | 212 |

For the bromostyene polymers made using toluene to control the molecular weight (Samples 2 and 4, Table 2), there were prominent peaks observed in the infra-red (IR) spectra at 1600 and 1509 cm, that were not present in those polymers made in MeCl$_2$ (Samples 1 and 3, Table 2). This is indicative that toluene takes part in the polymer forming reaction, while methylene chloride (MeCl$_2$) functions merely as an inert solvent.

EXAMPLE 14

Blends of a polyphenylene ether resin, rubber modified high impact polystyrene (HIPS) and poly(bromostyrene) were melt blended in a 30 mm twin screw extruder and injection molded into standard test pieces. The compositions of the blends were as follows:

| Component | Parts by Weight | Material Description |
| --- | --- | --- |
| PPO | 40 | poly(2,6-dimethyl-1,4-phenylene ether) resin (PPO ®, General Electric Co., 0.47 I.V.) |
| HIPS | 60 | A.H. 1897 high impact polystyrene, American Hoechst |
| BS | varies | polybromostyrene, content varied to bring blend to 7.0% bromine |
| Sb$_2$O$_3$ | 4.7 | antimony oxide |
| ADMEX 433B | 7.5 | phthalate ester, Sherex |
| KG-1652 | 2.5 | saturated styrene-butadiene block copolymer, Shell Oil |
| ZnO | 0.15 | zinc oxide |
| ZnS | 0.15 | zinc sulfide |

Four different blends (Samples 1–4) were prepared and evaluated for physical and chemical properties. The results are reported in Tables 5 and 6, below.

TABLE 5

| | Properties of Polybromostyrene in Composition of Each Sample | | | |
| --- | --- | --- | --- | --- |
| Sample | % Toluene* | % Bromine | Mw | Mn |
| 1 | 0 | 58.9 | 3000 | 1180 |
| 2 | 2.6 | 57.4 | 2100 | 1300 |
| 3 | 4.5 | 56 | 1700 | 980 |
| 4 | 8.5 | 54 | 1200 | 800 |

*Refers to amount of toluene that has reacted with the bromostyrene polymer during its polymerization.

TABLE 6

| | Properties of Compositions of Each Sample | | | | | |
| --- | --- | --- | --- | --- | --- | --- |
| Sample | HDT | F.C. | Izod | Gard. | TYS | UL-94 (1/16 inch) |
| 1 | 198 | 19.0 | 5.0 | 30 | 6.5 | V-O, 1.4 |
| 2 | 192 | 20.0 | 3.4 | 28 | 6.4 | V-O, 1.4 |
| 3 | 189 | 20.8 | 3.2 | 108 | 6.5 | V-O, 1.5 |
| 4 | 184 | 22.0 | 3.5 | 96 | 6.4 | V-O, 1.5 |

A description of the tests is given below:
HDT: Heat deflection temperature, in °F., under 264 psi, using ⅛ in. × ½ in. × 5 in. test specimen.
F.C.: Flow channel length, in inches, at about 570° F. melt temperature, using 150° F. mold and 10,000 psi injection pressure.
Izod: Notched Izod impact strength, ft. lb./in. of notch; ⅛ in. × ½ in. × 2.5 in. test specimen.
Gardner: Gardner (falling dart) impact, in. lb., ⅛ in. × 4 in. test disc.
TYS: Tensile yield strength, psi × 1000; ⅛ in. × 8.5 in. (½ in. wide guage length).
UL-94: Average self-extinguishing time, in seconds, for five 1/16 in. × ½ in. × 5 in. molded bars tested in accordance with Underwriters Laboratories Test Bulletin 94.

The Gardner impact values for the molded parts show a sharp break with blends made with poly(bromostyrene) having molecular weights (Mw) greater than 1700. The Gardner impact typically shows a sharp drop when the limits of compatibility are exceeded for polymer blends. The Izod impact falls as the molecular weight (Mw) of the poly(bromostyrene) drops. High Izod values are often found for laminating injection molded parts because of the orientation found in the test bar. Examination of the injection molded samples shows severe lamination in the samples with poly(bromostyrene) having a molecular weight (Mw) above 1700.

It should be understood that other modifications of the present invention, in its various aspects, are possible. Thus, variations of the particular embodiments shown may be made without departing from the scope as defined by the appended claims, and without sacrificing the chief benefits.

I claim:

1. A process for preparing a poly(bromoalkenyl aromatic) polymer of controlled molecular weight, comprising
    (a) cationically polymerizing a nuclear bromine-substituted alkenyl aromatic monomer or a mixture of nuclear bromine-substituted monomers in solution in an organic solvent, in the presence of a Lewis acid catalyst and an aromatic chain transfer agent for the cationic polymerization reaction, until the desired molecular weight has been achieved; and
    (b) separating and isolating the resulting poly(bromoalkenyl aromatic) polymer from the reaction mixture.

2. A process according to claim 1, in which the alkenyl aromatic monomer has the formula

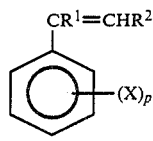

in which X represents independently a lower alkyl group having from 1 to 6 carbon atoms, a lower alkenyl group having from 1 to 6 carbon atoms, and bromine, there being at least one bromine atom always present on the ring; p represents the total number of X substituents on the ring and is an integer from 1 to 5; and $R^1$ and $R^2$ represent independently lower alkyl groups having from 1 to 6 carbon atoms, lower alkenyl groups having from 1 to 6 carbon atoms, and hydrogen.

3. A process according to claim 1, in which the alkenyl aromatic monomer is monobromostyrene.

4. A process according to claim 1, in which the alkenyl aromatic monomer is dibromostyrene.

5. A process according to claim 1, in which the alkenyl aromatic monomer is tribromostyrene.

6. A process according to claim 1, in which the alkenyl aromatic monomer is a mixture of two or more bromostyrenes selected from mono-, di- and tribromostyrene.

7. A process according to claim 1, in which the chain transfer agent is an aromatic compound or polymer having a rate of alkylation equal to, or greater than, that of the compound chlorobenzene.

8. A process according to claim 7, in which the chain transfer agent is an aromatic compound selected from toluene, chlorobenzene, bromobenzene, fluorobenzene, alkyl aromatic ethers (including anisole), and diphenyl ethers.

9. A process according to claim 8, in which the chain transfer agent is toluene.

10. A process according to claim 1, in which the Lewis acid catalyst is selected from aluminum trichloride ($AlCl_3$), boron trifluoride ($BF_3$), titanium tetrachloride ($TiCl_4$), antimony trichloride ($SbCl_3$), stannic chloride ($SnCl_4$), ferric chloride ($FeCl_3$), and sulfuric acid ($H_2SO_4$).

11. A process according to claim 10, in which the Lewis acid is aluminum trichloride ($AlCl_3$).

12. A process according to claim 1, in which the organic solvent is a halohydrocarbon.

13. A process according to claim 12, in which the halohydrocarbon is selected from methylene chloride, chloroform, carbon tetrachloride, 1,2-dichloroethane, 1,1,2-trichloroethane, dibromomethane, and 1,2-dibromoethane.

14. A process according to claim 13, in which the organic solvent is methylene chloride.

15. A process according to claim 1, in which the polymerization reaction proceeds exothermically and the heat of reaction serves as the heat source.

16. A process according to claim 1, in which in step (b) an antisolvent is added to the reaction mixture to precipitate the polymer, which is thereafter recovered and dried.

17. A process according to claim 1, in which in step (b) the reaction mixture is extracted with water to leave an organic phase containing the polymer and a water phase, the water phase is separated, and the organic phase is distilled to separate the solvent from the polymer.

18. A process according to claim 1, in which the molecular weight of the poly(bromoalkenyl aromatic) end product is sufficiently low to make it compatible (miscible) with another thermoplastic polymer, as manifested by the optical clarity of a film made from a mixture of the two polymers.

19. A process according to claim 1, in which the end product is a poly(dibromostyrene) polymer having a weight average molecular weight no greater than about 1250, or a number average molecular weight no greater than about 850.

20. A process according to claim 1, in which the end product is a poly(tribromostyrene) polymer having a weight average molecular weight no greater than about 1150, or a number average molecular weight no greater than about 900.

21. A process for preparing a poly(bromoalkenyl aromatic) polymer having a number average molecular weight of less than about 1100 and a bromine content of from about 45 to about 60 percent by weight, based on 100 percent by weight of the polymer, comprising:
(a) cationically polymerizing a nuclear bromine-substituted alkenyl aromatic monomer or a mixture of nuclear bromine-substituted monomers in solution in an organic solvent, in the presence of a Lewis acid catalyst and an aromatic chain transfer agent for the cationic polymerization reaction, until the desired molecular weight has been achieved; and
(b) separating and isolating the resulting poly(bromoalkenyl aromatic) polymer from the reaction mixture.

* * * * *